United States Patent [19]

Jensen

[11] Patent Number: 4,893,498

[45] Date of Patent: Jan. 16, 1990

[54] METHOD AND APPARATUS FOR DETECTING LIQUID LEAKS

[75] Inventor: Jay E. Jensen, Raritan, N.J.

[73] Assignee: Mobil Oil Corporation, New York, N.Y.

[21] Appl. No.: 183,121

[22] Filed: Apr. 19, 1988

[51] Int. Cl.⁴ .............................................. G01M 3/32
[52] U.S. Cl. ....................................... 73/49.2; 73/299
[58] Field of Search ........................... 73/49.2, 299, 40

[56] References Cited

U.S. PATENT DOCUMENTS

| | | | |
|---|---|---|---|
| 3,913,401 | 10/1975 | Sweeney | 73/299 |
| 4,394,346 | 7/1983 | Morooka | 73/299 X |
| 4,474,054 | 10/1984 | Ainlay | 73/49.2 |

FOREIGN PATENT DOCUMENTS

| | | | |
|---|---|---|---|
| 133613 | 10/1981 | Japan | 73/299 |
| 89589 | 5/1986 | Japan | 73/299 |
| 607011 | 11/1978 | Switzerland | 73/40 |

Primary Examiner—Stewart J. Levy
Assistant Examiner—Joseph W. Roskos
Attorney, Agent, or Firm—Alexander J. McKillop; Charles J. Speciale; Michael J. Mlotkowski

[57] ABSTRACT

A liquid leak detector for above-ground tanks includes an upright standpipe connected to the tank so that the standpipe can be filled with liquid from the tank to the same level as the liquid in the tank. A pressure transducer is connected between the bottom of the tank and the bottom of the standpipe to measure the difference in pressure of the liquids in the tanks and standpipe. Any change in the liquid pressure at the bottom of the tank as a result of leakage from the tank will change the pressure differential on the pressure transducer. This changes the output of the transducer which can be recorded to indicate leakage from the tank.

9 Claims, 4 Drawing Sheets

METHOD AND APPARATUS FOR DETECTING LIQUID LEAKS

FIELD OF INVENTION

The present invention relates to a liquid leak detector, and, more particularly, to a method and apparatus for detecting leaks from above-ground, vertical, uniformly shaped storage tanks.

BACKGROUND OF THE INVENTION

A major problem with above-ground liquid storage tanks, particularly those that contain liquids which can adversely contaminate the surrounding grounds, is to be able to determine if the tank leaks. This problem becomes greater in large tanks, greater than about 20 feet in diameter, since relatively large leaks will cause only a small change in the level of the liquid in such tanks. Also, in above-ground tanks, changes in the ambient, such as temperature and wind, can affect the level of the liquid in the tank.

Heretofore, the best available technique for determining leaks for above-ground tanks was to put a six foot head of water in the tank and use visual detection of liquid level variations in a sight glass outside the tank to measure possible leaks. This technique has the disadvantage that the accuracy of the visual detection is limited to about 1/16 inch variation in the tank. This means that for a 100 foot diameter tank there must be a leak of at least 300 gallons and for a 50 foot diameter tank there must be a leak of about 100 gallons to obtain a detection of the leak. Also, changes in temperature, which can cause the liquid in the tank to expand, significantly affects the measurement as well as wind effects and sight glass meniscus resolution.

Another technique which has bee considered is to place a pressure transducer adjacent the bottom of the tank which measures the pressure of the liquid at the bottom of the tank. This technique is not affected by changes in temperature since, although the volume of the liquid may change due to expansion of the liquid, its weight does not change. This technique has the problem that it requires a transducer which can not only measure the heavy weight of the liquid in the tank, but which can also measure slight difference in the weight. Such a transducer is either not readily available or is expensive. Therefore, it would be desirable to have a detector for accurately detecting small leaks in large above-ground tanks which is not affected by changes in ambient conditions and which is relatively inexpensive.

SUMMARY OF THE INVENTION

A liquid leak detector for a storage tank includes an upright standpipe which can be connected to the tank so that the standpipe can be filled with the liquid from the tank to the same level in the standpipe as in the tank. The liquid connection between the standpipe and the tank is disconnected and the pressure differential between the pressure of the liquid in the tank and the liquid in the standpipe is measured. Any difference in this pressure differential indicates that there is a leak in the tank.

DETAILED DESCRIPTION OF PREFERRED EMBODIMENT

Figure 1:
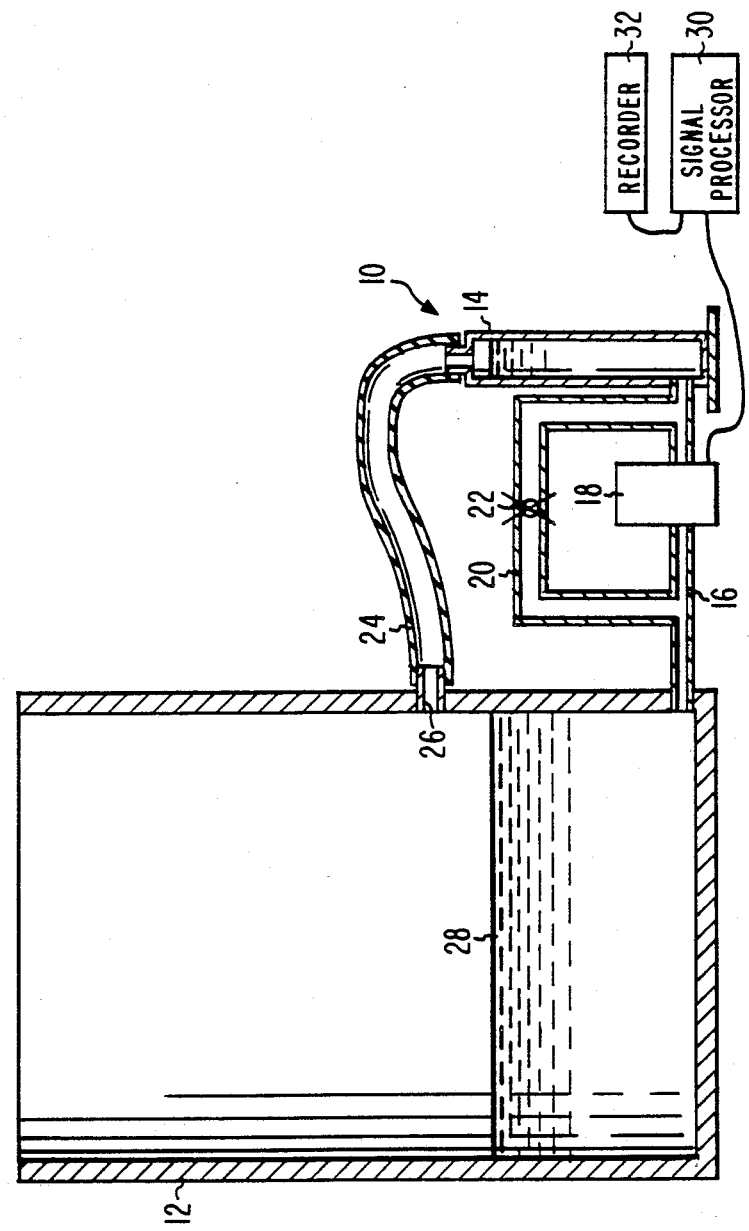
FIG. 1 is a schematic presentation of the liquid leak detector of the, present invention.

Referring initially to FIG. 1, there is shown a leak detector 10 of the present invention connected to an above-ground cylindrical tank 12. The detector includes an upright cylindrical standpipe 14 seated on the ground adjacent the tank 12. Tubing or pipe 16 extends between the standpipe 14 and the tank 12 adjacent the bottom of each. Tubing or pipe 16 connects to a pressure transducer 18 which separates the standpipe 14 from the tank 12 and is adapted to measure pressure differentials. A second tube or pipe 20 extends between the standpipe 14 and the tank 12 bypassing the transducer 18. The second tube or pipe 20 contains a valve 22. A hose 24 is connected between the top of the standpipe 14 and an outlet opening 26 in the tank 12 above the level of the liquid 28 in the tank 12. The transducer 18 is electrically connected to a signal processor 30 for processing the signal from the transducer 18, and the signal processor 30 is electrically connected to a recorder 32, such as a pen recorder, for recording the output of the signal processor 30.

In the operation of the leak detector 10 to determine any leaks in the tank 12, the valve 22 is opened to allow liquid 28 from the tank 12 to flow through the second tube or pipe 20 into the standpipe 14 until the level of the liquid in the standpipe is level with that in the tank 12. The valve 22 is then closed to disconnect the tank 12 from the standpipe 14. The pressure transducer 18 is turned on to measure the pressure differential between the liquid in the tank 12 and the liquid in the standpipe 14. If there is a leak in the tank 12, the level of the liquid 28 in the tank 12 will change causing a change in the pressure measured by the transducer 18. This results in a change in the pressure differential being read by the transducer 18 which will be indicated by the recorder 32.

Since the level of the liquid in the standpipe 14 does not change, small changes in the level of the liquid 28 in the tank 12 resulting from small leaks, will be detected by the transducer 18. This makes it possible to use a very sensitive liquid to liquid differential pressure transducer 18 to measure head differences in the range of 0.001 inches of water column (0.0000361 psi) between the liquid 28 in the tank 12 and the liquid in the standpipe 14. Since the transducer 18 is measuring pressure head and not volume of liquid, changes in the level of the liquid in either the tank 12 or standpipe 14 resulting from temperature changes will not affect the output of the transducer 28. Also, since the top of the standpipe 14 is connected to the tank 12 above the level of the liquid 28 by the hose 24, wind effects on the liquid 28 in the tank 12 will also be applied to the liquid in the standpipe 14. Since the transducer 18 is measuring a difference in pressure, the wind effects will be canceled out and will not affect the output of the transducer 18.

Figure 2:
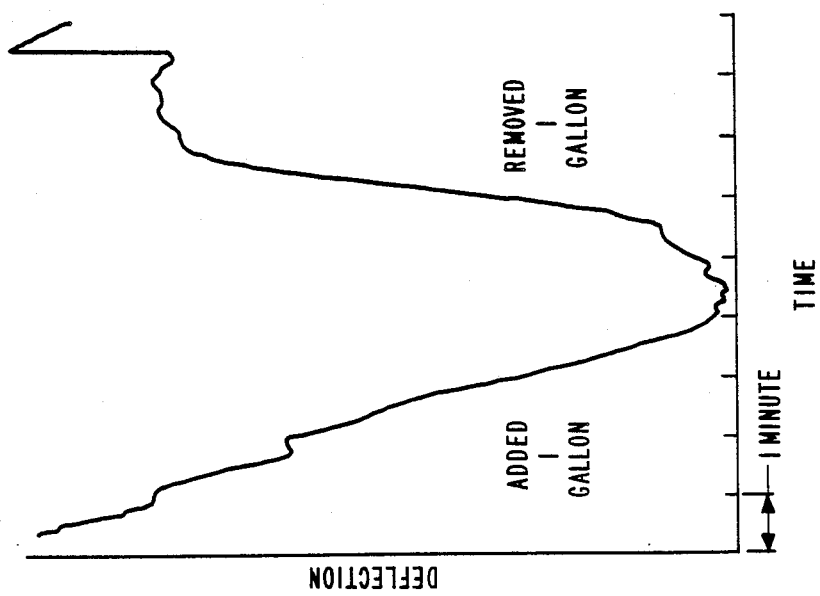
Figure 3:
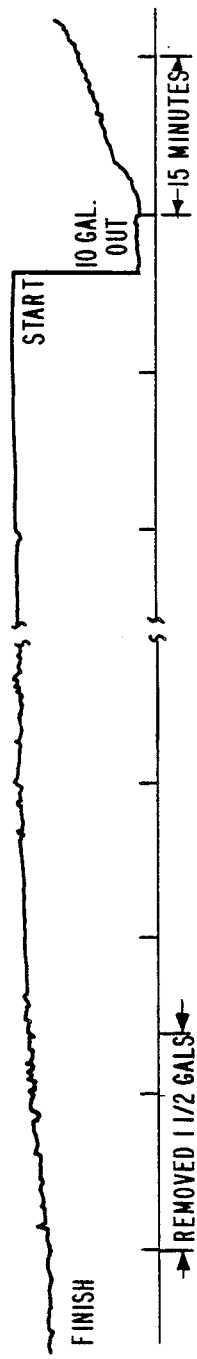

FIGS. 2 to 5 show the recordings made from tests made on various tanks using the leak detector 10 of the present invention. For the tests shown in FIGS. 2 and 3, the tank used was 50 feet in diameter, 35 feet high and contained approximately 60,000 gallons of water. FIG. 2 shows the output of the recorder 32 when a gallon of water was removed from the tank over a period of 1 minute and then added back to the tank. As can be seen from FIG. 2, this slight change in the amount of liquid in the tank was clearly discerned by the leak detector. FIG. 3 shows the output of the recorder when 1½ gallons of water were removed from the tank over a period of about 20 minutes. This shows that a slower leak can also be easily discerned by the leak detector 10.

Figure 5:
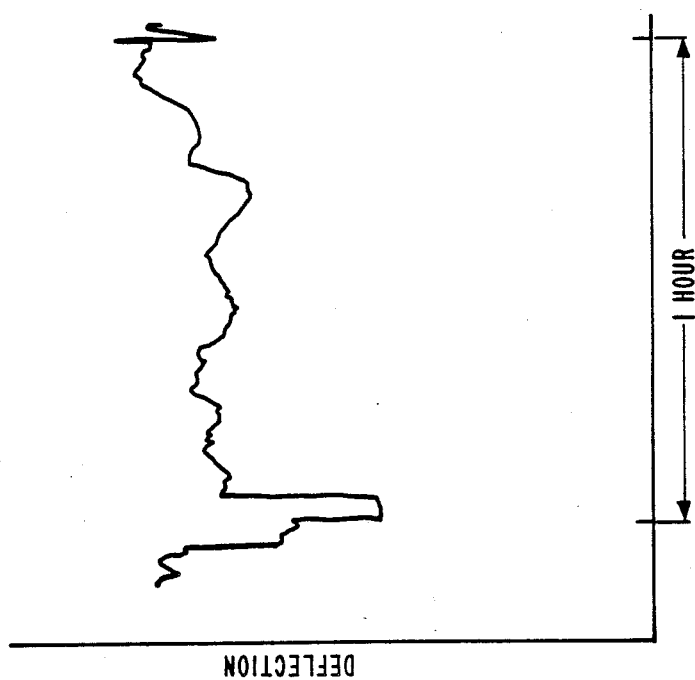
FIGS. 2 to 5 are graphs showing the results of leak tests made on tanks using the detector of the present invention.
Figure 4:
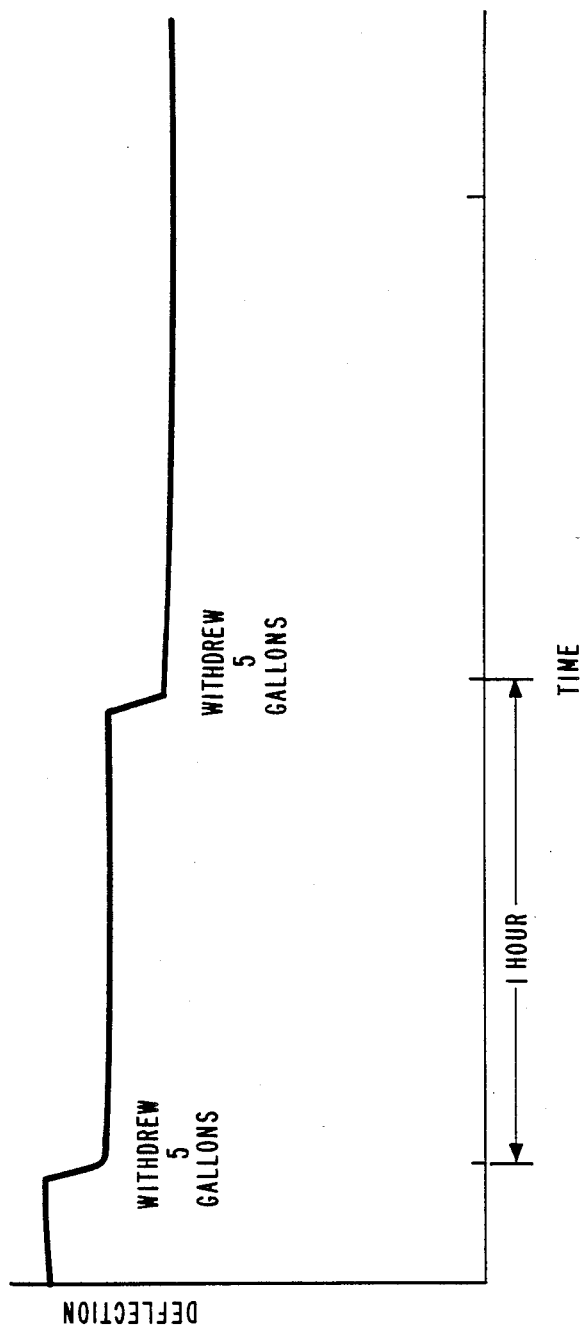

For the test shown in FIG. 4, the tank used was 30 feet in diameter and 41 feet high. The tank contained Mobil Heating Oil No. 2 at a depth of 37 inches (about 16,000 gallons). During a test period of 2⅓ hours, 5 gallons of oil were rapidly removed near the beginning of the test period and another 5 gallons were removed near the middle of the test period. The removal of these two small amounts of the oil can be clearly seen in FIG. 4 by the two drops in the chart. FIG. 5 shows the results of a field test in which a tank 75 feet in diameter and 40 feet high contained about 7 feet 7 inches of Mobil Heating Oil No. 2 (approximately 257,705 gallons). At the start of the test 4 gallons of oil were rapidly removed from the tank. This can be clearly seen by the overall drop in the line of the chart. The chart undulations result from the effect of cold, windy weather conditions. However, these conditions do not adversely affect the ability to detect even small amounts of liquid leaking from the tank.

Thus, there is provided by the present invention a method and apparatus for detecting leaks in above-ground, storage tanks which will accurately detect small leaks. The detector of the present invention is not adversely affected by changes in ambient conditions, such as temperature, wind and the like, and is inexpensive to manufacture and install. The leak detector of the present invention can be used satisfactorily for liquids that are very volatile and whose vapors are heavier than air, such as gasoline. Also, it can be used as part of, or in conjunction with, a storage tank inventory control system.

Although the present invention has been described with preferred embodiments, it is to be understood that modifications and variations may be resorted to without departing from the spirit and scope of the present invention, as those skilled in the art will readily understand. Such modifications and variations are considered to be within the purview and scope of the appended claims.

What is claimed is:

1. A liquid leak detector for a storage tank, comprising:
   (a) a vertically upright standpipe;
   (b) means for connecting said standpipe to a storage tank at the bottom of the tank to fill the standpipe with the liquid in the tank to the same level as the liquid in the tank;
   (c) a first pipe connected to said standpipe at its bottom and adapted to be connected to the tank at the bottom of the tank;
   (d) a pressure transducer in said first pipe for measuring the pressure differential between the liquid in the tank and the liquid in the standpipe, said pressure transducer having an electrical output signal corresponding to the pressure differential; and
   (e) a hose connected to the top of the standpipe and adapted to be connected to the tank above the level of the liquid in the tank;
   wherein said means for connecting said standpipe to the tank is a second pipe connected to the standpipe and bypassing the transducer, said second pipe having a valve therein.

2. A leak detector in accordance with claim 1 including a recorder connected to the pressure transducer to record the output of the pressure transducer.

3. A liquid storage system comprising:
   an upright storage tank mounted on the ground and containing a liquid;
   a leak detector for said storage tank including:
   a vertically upright standpipe mounted on the ground adjacent the tank;
   means connecting the bottom of said standpipe to the bottom of the storage tank to fill the standpipe with the liquid from the tank to the same level as the liquid in the tank; and
   means for measuring the pressure difference between the liquid in the tank and the liquid in the standpipe.

4. A storage system in accordance with claim 3 in which the storage tank and the standpipe are each of uniform vertical dimension.

5. A storage system in accordance with claim 4 in which the storage tank and the standpipe are cylindrical along their entire vertical height.

6. A storage system in accordance with claim 4 including a first pipe connected between the bottom of the standpipe and the bottom of the storage tank, and the means for measuring the pressure differential is in said first pipe.

7. A storage system in accordance with claim 6 in which the means for measuring the pressure differential is a pressure transducer having an electrical output signal corresponding to the pressure differential.

8. A storage system in accordance with claim 7 in which the means connecting the standpipe to the storage tank includes a second pipe connected between the bottom of the standpipe and the bottom of the tank bypassing the transducer, and a valve in said second pipe.

9. A storage system in accordance with claim 8 including a hose connected to the top of the standpipe and to the storage tank above the level of the liquid in the storage tank.

* * * * *